(12) United States Patent
Shimizu

(10) Patent No.: US 11,418,082 B2
(45) Date of Patent: Aug. 16, 2022

(54) STATOR USED FOR MOTOR AND METHOD FOR MANUFACTURING SAID STATOR

(71) Applicant: TOYO DENSO KABUSHIKI KAISHA, Tokyo (JP)

(72) Inventor: Naoaki Shimizu, Tsurugashima (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/023,440

(22) Filed: Sep. 17, 2020

(65) Prior Publication Data

US 2021/0126502 A1    Apr. 29, 2021

(30) Foreign Application Priority Data

Oct. 29, 2019  (JP) .............................. JP2019-196226

(51) Int. Cl.
  *H02K 3/34*    (2006.01)
  *H02K 1/16*    (2006.01)
  *H02K 3/30*    (2006.01)

(52) U.S. Cl.
  CPC ................. *H02K 3/34* (2013.01); *H02K 1/16* (2013.01); *H02K 1/165* (2013.01); *H02K 3/30* (2013.01); *H02K 3/345* (2013.01)

(58) Field of Classification Search
  CPC ........... H02K 1/16; H02K 1/165; H02K 3/30; H02K 3/34; H02K 3/345; H02K 3/50
  USPC .............................. 310/40 R, 179, 180, 181
  See application file for complete search history.

(56) References Cited

U.S. PATENT DOCUMENTS

| | | | |
|---|---|---|---|
| 6,137,198 A | 10/2000 | Kawamura | |
| 2004/0145250 A1* | 7/2004 | Kudo | F04D 25/0633 310/43 |
| 2009/0026870 A1* | 1/2009 | Hoshino | H02K 3/522 310/194 |
| 2010/0181851 A1 | 7/2010 | Shinkawa | |
| 2013/0049496 A1* | 2/2013 | Chamberlin | H02K 3/24 310/54 |
| 2015/0229192 A1* | 8/2015 | Yoshida | H02K 5/1732 310/43 |

(Continued)

FOREIGN PATENT DOCUMENTS

| | | |
|---|---|---|
| JP | 06-233483 A | 8/1994 |
| JP | 2018-074806 A | 5/2018 |

OTHER PUBLICATIONS

Official Communication issued in corresponding European Patent Application No. 20197974.7, dated Mar. 19, 2021.

*Primary Examiner* — Rashad H Johnson
(74) *Attorney, Agent, or Firm* — Keating and Bennett, LLP

(57) ABSTRACT

A stator used for a motor and having excellent vibration resistance, waterproofness, and an insulating property. The stator used for a motor includes a stator core having a plurality of teeth arranged at substantially equal intervals on a same circumference, and an insulator covering the teeth, and coil portions are formed by wires being winded around portions of the insulator that covers the plurality of teeth. The insulator includes first wall portions provided on the center axis side with respect to the coil portion, and molded portions formed, by resin, on the center axis side with respect to the first wall portions. Wire extended portions of the wire pulled out from the coil portion straddle the first wall portions. Wire terminal end portions are connected to bus rings. The bus rings are embedded in the molded portions.

10 Claims, 9 Drawing Sheets

(56) References Cited

U.S. PATENT DOCUMENTS

| | | |
|---|---|---|
| 2016/0164366 A1 | 6/2016 | Rauch et al. |
| 2017/0126090 A1 | 5/2017 | Chen et al. |
| 2018/0123416 A1 | 5/2018 | Yamasaki et al. |
| 2018/0316235 A1* | 11/2018 | Yamada .................... H02K 5/08 |
| 2020/0373795 A1* | 11/2020 | Yamamoto ............. H02K 1/148 |

* cited by examiner

STATOR USED FOR MOTOR AND METHOD FOR MANUFACTURING SAID STATOR

BACKGROUND OF THE INVENTION

Field of the Invention

The present invention relates to a stator and a method for manufacturing the stator, and more particularly to a structure of a stator used for an outer rotor type motor and a method for manufacturing the same.

Description of the Related Art

Various proposals have been made regarding a connection structure of a plurality of wires (coil wires) pulled out from coil portions of a stator used for a motor. For example, Japanese Laid-open Patent Publication (Kokai) No. 2018-74806 discloses a structure in which a holding member holds a stator and a circuit board, a first through hole of the holding member is arranged below a second through hole of the circuit board, and a coil wire constituting the stator is electrically connected to the circuit board through the first through hole and the second through hole. Japanese Laid-open Patent Publication (Kokai) No. H06-233483 discloses a structure in which in-phase coil wires are connected to phase-separating conductive members that are laminated and fixed in an electrically insulating state.

In the technique disclosed in the mentioned-above Japanese Laid-open Patent Publication (Kokai) No. 2018-74806, since the circuit board is fixed only through the holding member, it cannot be said that the structure is strong against vibration. Further, Japanese Laid-open Patent Publication (Kokai) No. 2018-74806 does not discuss waterproofness of a winding extending from the coil portion to the circuit board.

In contrast, in the technique disclosed in the mentioned-above Japanese Laid-open Patent Publication (Kokai) No. H06-233483, the phase-separating conductive member is arranged on the coil wires, and an end portion of the coil wire is fixed to the phase-separating conductive member so as to be vertical to the winding axis of a coil (be in the axial direction of the coil having a substantially cylindrical shape). Before connecting a winding end portion to the phase-separating conductive member, it is necessary to mechanically or chemically perform the process of removing the insulating coating on the winding end portion. However, in the structure disclosed in Japanese Laid-open Patent Publication (Kokai) H06-233483, since the winding end portion and the coil portion are close to each other, there is risk that part of the coating on the coil portion is accidentally removed in the process of removing the coating from a winding terminal end portion, and therefore an insulating property is lowered. Also in Japanese Laid-open Patent Publication (Kokai) No. H06-233483, waterproofness of the winding from the coil portion to the phase-separating conductive member is not discussed.

SUMMARY OF THE INVENTION

The present invention provides a stator used for a motor and excellent in vibration resistance, waterproofness, and an insulating property.

Accordingly, an aspect of the present invention is to provide a stator including a stator core that includes a plurality of teeth radially projecting with a center axis of the stator as a center, and an insulator that covers at least the plurality of teeth, wherein a plurality of coil portions is formed by winding wires around portions of the insulator that cover the plurality of teeth. The insulator includes a first wall portion that has a cylindrical shape and is provided on a side of the center axis with respect to the plurality of coil portions, and a molded portion containing a resin and formed on a side of the center axis with respect to the first wall portion. Each of the wires pulled out from each of the plurality of coil portions includes a wire terminal end portion on a tip side, and a wire extended portion between the wire terminal end portion and the coil portion. The wire extended portion straddles the first wall portion, and a wire connecting member to which the wire terminal end portion is connected is held by the molded portion.

According to the aspect of the present invention, insulating coating on a winding end portion can be removed at a location away from the coil portion. Therefore, it is possible to prevent the insulating coating on the coil wire in the coil portion from being removed and to improve the insulating property. Furthermore, by connecting the winding end portion to a bus ring, attaching the bus ring to the insulator while twisting (rotating) the bus ring, and molding the bus ring with resin, it is possible to improve vibration resistance, the insulating property, and waterproofness.

Further features of the present invention will become apparent from the following description of exemplary embodiments (with reference to the attached drawings).

DESCRIPTION OF THE EMBODIMENTS

Hereinafter, an embodiment of the present invention will be described in detail with reference to the drawings.

First, the overall configuration of a stator according to the embodiment of the present invention will be described.

Figure 1A:
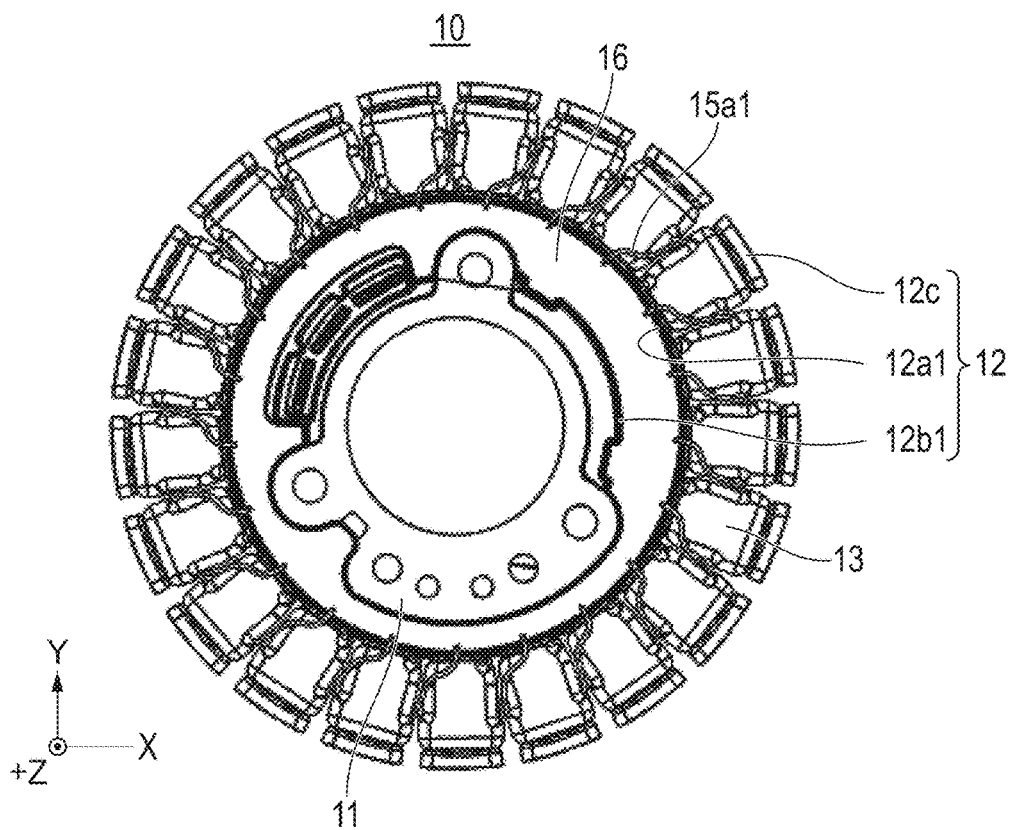
FIGS. 1A and 1B are views illustrating a first surface and a second surface of a stator according to an embodiment of the present invention, respectively.
Figure 1B:
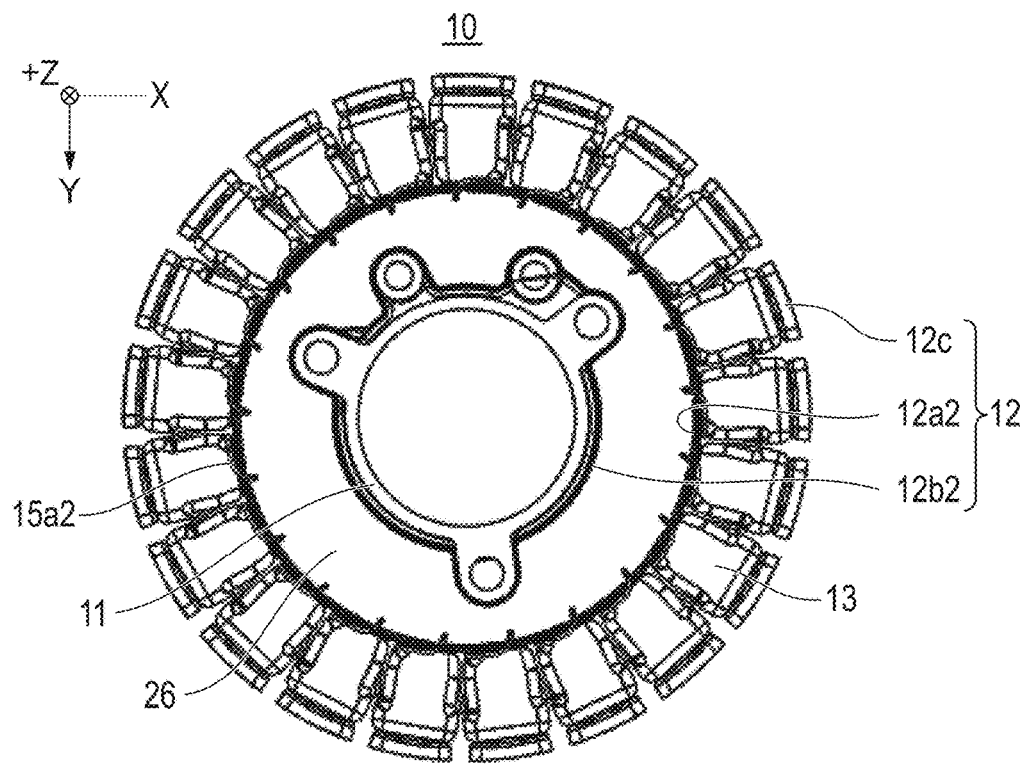

FIG. 1A is a view illustrating a first surface of a stator 10 according to the embodiment of the present invention. FIG. 1B is a view illustrating a second surface of the stator 10.

Figure 2:
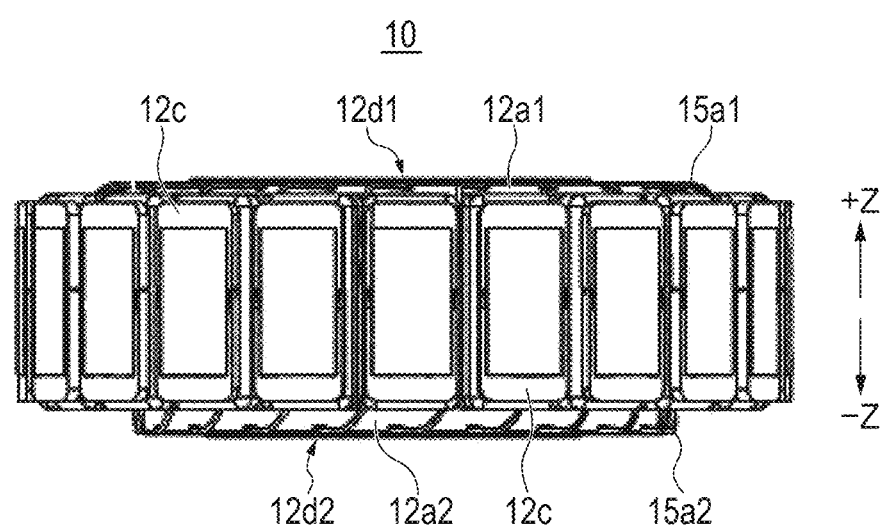
FIG. 2 is a view of the stator as viewed from the outer peripheral side.

Here, the stator 10 has an annular shape, and two surfaces parallel to the radial direction are referred to as a first surface and a second surface, respectively. FIG. 2 is a view of the stator 10 as viewed from the outer peripheral side.

The stator 10 includes a stator core 11 which is a metal member. The stator core 11 includes a yoke portion formed in an annular shape, and a plurality of teeth arranged on the outer circumference of the yoke at substantially equal intervals in the circumferential direction and provided radially with the center axis (the axis parallel to the thrust direction and passing through the center of the stator 10) as the center. Furthermore, the stator 10 includes an insulator 12 which is made of a dielectric (insulating) resin and covers a predetermined portion of the stator core 11. A wire (coil wire) is wound in a coil shape around each of the teeth covered with the insulator 12 (hereinafter, referred to as "winding poles") to form a coil portion 13.

It should be noted that since most part of the stator core 11 is covered with the insulator 12, only the yoke portion is illustrated in FIGS. 1A and 1B. Since the structure of the stator core 11 itself is not the gist of the present invention, illustration thereof is omitted. For example, the stator core 11 has a configuration similar to that of the stator core illustrated in FIG. 3 and the like of International Publication No. WO2016/047033 A1.

In FIG. 1A, regarding the insulator 12, only end portions 12c on the end side of the coil portions 13, a first wall portion 12a1 provided in a cylindrical shape on the center axis side with respect to the coil portion 13, and a second wall portion 12b1 provided on the center axis side with respect to the first wall portion 12a1, appear as the outer appearance. Similarly, in FIG. 1B, regarding the insulator 12, only the end portions 12c on the end side of the coil portions 13, a first wall portion 12a2 provided in a cylindrical shape on the center axis side with respect to the coil portions 13, and a second wall portion 12b2 provided on the center axis side with respect to the first wall portion 12a2, appear as the outer appearance. The insulator 12 only needs to be able to cover a predetermined portion of the stator core 11, and includes, for example, two resin members that sandwich and are fitted to the stator core 11 in the thrust direction of the stator core 11.

As a method or an apparatus for winding the wire around the winding pole to form the coil portion 13, for example, a known technique disclosed in Japanese Laid-open Patent Publication (Kokai) No. H10-112962 can be used. The method for forming the coil portion 13 in the stator 10 is not the gist of the present invention, and thus the description thereof is omitted.

On the first surface side of the stator 10, a bus ring 17 (see FIGS. 3A and 3B described later), which has an annular shape and is a wire connecting member for connecting the wires pulled out from the coil portions 13, is fitted between the first wall portion 12a1 and the second wall portion 12b1 of the insulator 12. The portion where the bus ring 17 is fitted is filled with an insulating resin (dielectric resin) to form a molded portion 16. It should be noted that, in FIG. 1A, the bus ring 17, which is hidden by the molded portion 16, is not shown.

On the second surface side of the stator 10, a bus ring 27 (see FIGS. 4A and 4B described later), which has an annular shape, is fitted between the first wall portion 12a2 and the second wall portion 12b2 of the insulator 12. The portion where the bus ring 27 is fitted is filled with an insulating resin (dielectric resin) to form a molded portion 26. In FIG. 1B, the bus ring 27, which is hidden by the molded portion 26, is not shown.

Figure 3A:
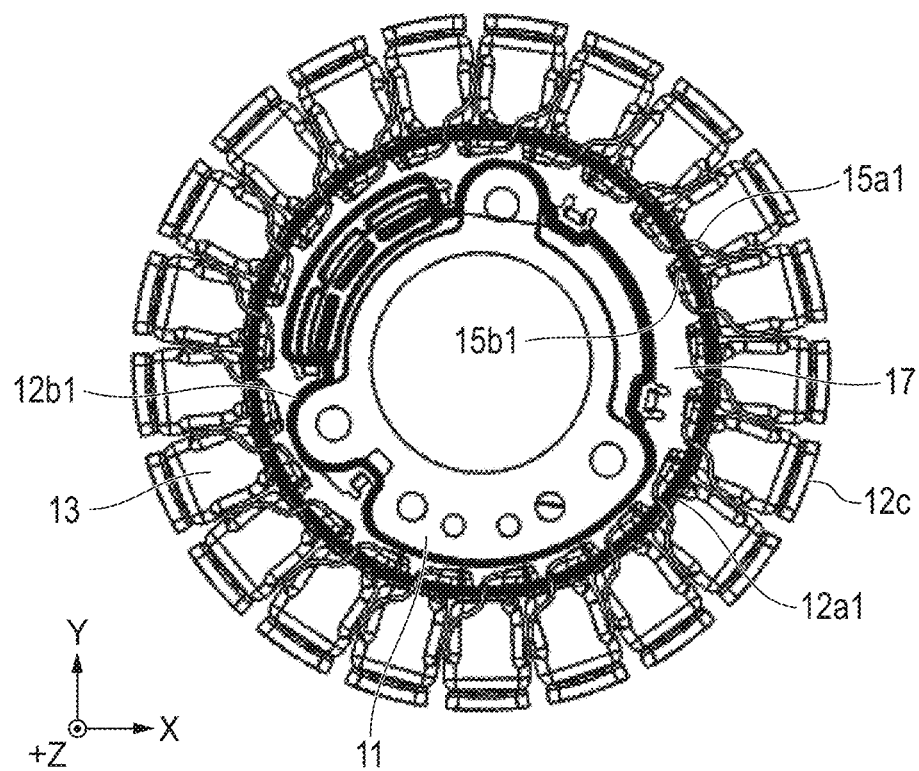
FIGS. 3A and 3B are a view showing a state in which a molded portion on the first surface side of the stator is removed and a plan view of a bus ring arranged on the first surface side, respectively.
Figure 3B:
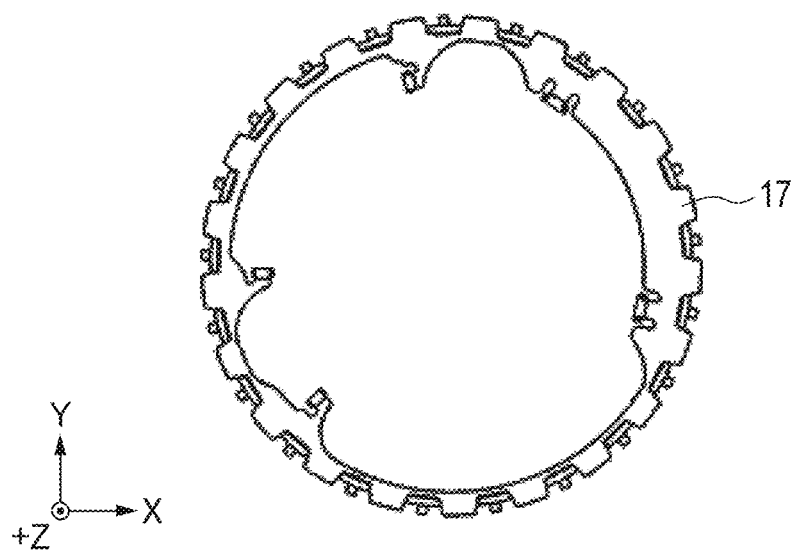

FIG. 3A is a view showing the first surface of the stator 10 with the molded portion 16 removed, and FIG. 3B is a plan view showing the bus ring 17 alone. Two wires for connecting to the bus rings 17, 27 are pulled out from each coil portion 13 by the length obtained by adding the length of the wire extended portion and the length of the wire terminal end portion, which is on the tip side from the wire extended portion (see FIGS. 7A and 7B). In one of the two wires pulled out from the coil portion 13, a wire extended portion 15a1 gets over (straddles) the first wall portion 12a1, and a wire terminal end portion 15b1 is connected to the bus ring 17. The bus ring 17 is fitted into the insulator 12 with the wire terminal end portion 15b1 being connected thereto, and then embedded in the molded portion 16.

Figure 4A:
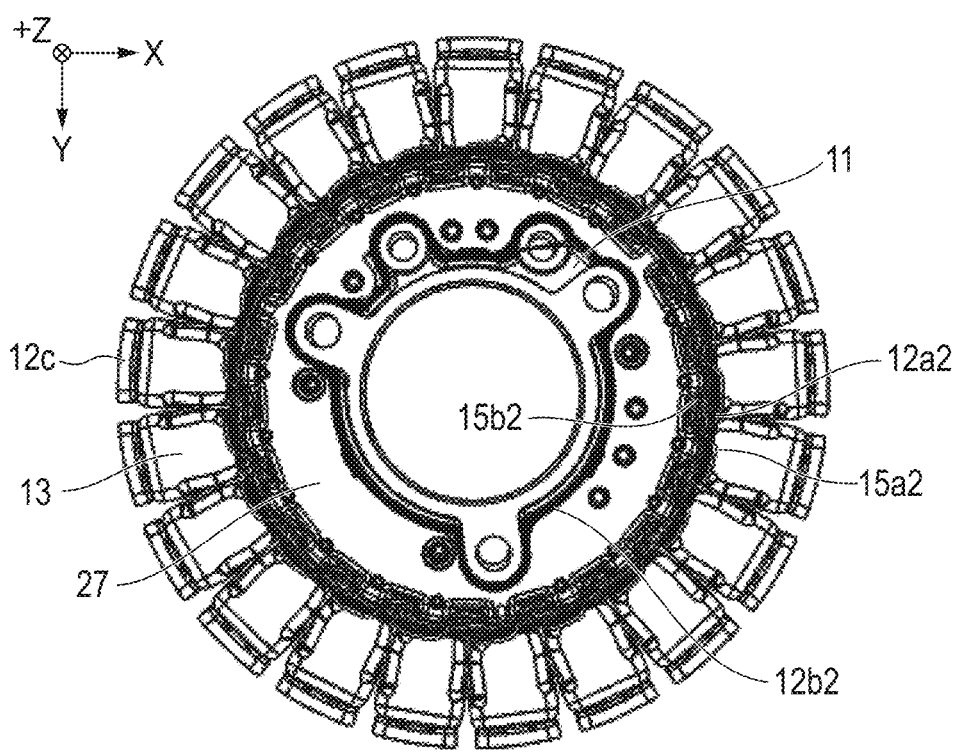
FIGS. 4A and 4B are a view showing a state in which a molded portion on the second surface side of the stator is removed and a plan view of a bus ring arranged on the second surface side.
Figure 4B:
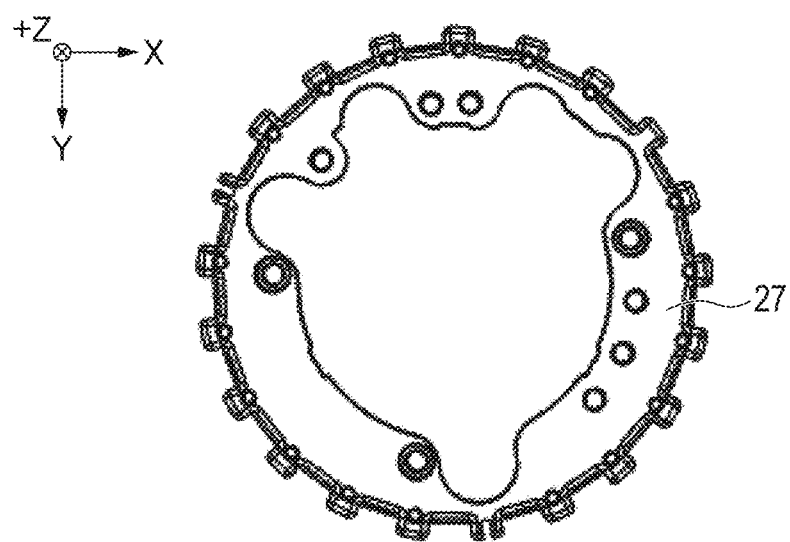

FIG. 4A is a view showing the second surface of the stator 10 with the molded portion 26 removed, and FIG. 4B is a plan view showing the bus ring 27 alone. In the other of the two wires pulled out from each coil portion 13, the wire extended portion 15a2 gets over (straddles) the first wall portion 12a2, and the wire terminal end portion 15b2 is connected to the bus ring 27. The bus ring 27 is fitted into the insulator 12 with the wire terminal end portion 15b2 being connected thereto, and then embedded in the molded portion 26.

Figure 5:
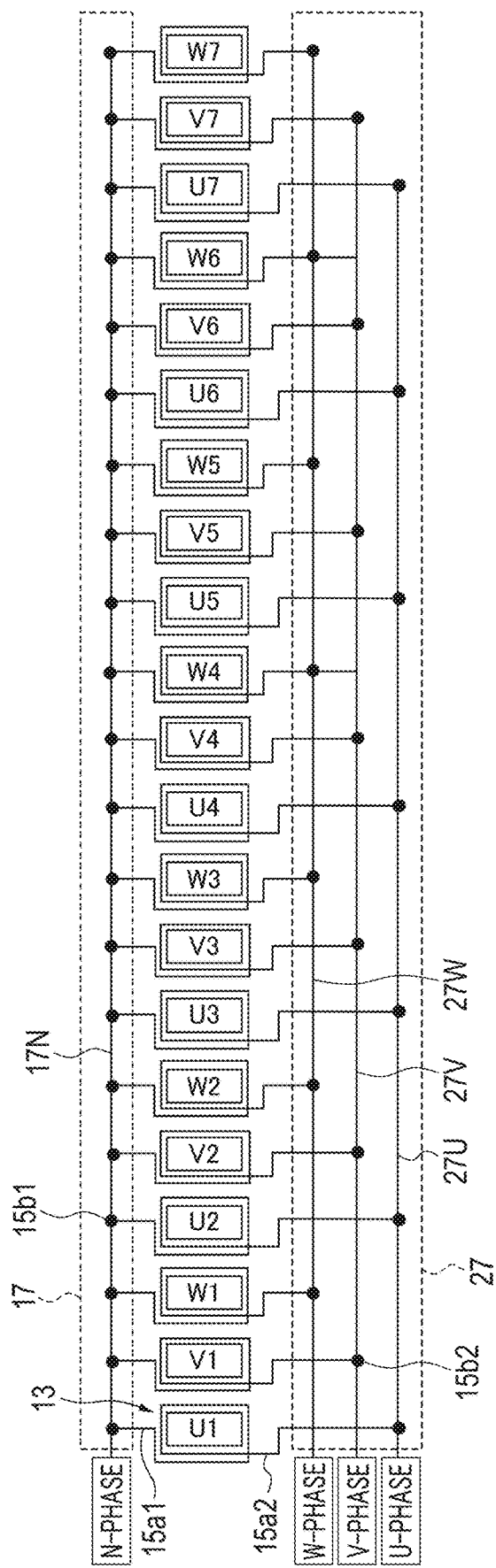
FIG. 5 is a diagram schematically showing a connection structure among two bus rings, wire extended portions, and wire terminal end portions.

FIG. 5 is a diagram schematically showing a connection structure among the bus rings 17, 27, the wire extended portions 15a1, 15a2, and the wire terminal end portions 15b1, 15b2. In FIG. 5, the twenty-one coil portions 13 are illustrated as coil portions U1 to U7, V1 to V7, or W1 to W7. The bus ring 17 includes one wiring 17N, and the wires (wire extended portions 15a1, wire terminal end portions 15b1) pulled out from the coil portions U1 to U7, V1 to V7, W1 to W7 to the first surface side are connected to the wiring 17N. It should be noted that the bus ring 17 may be made of metal, whereby the bus ring 17 itself may be used as the wiring 17N.

The bus ring 27 includes three wirings 27U, 27V, 27W insulated from one another. The wires (wire extended portions 15a2, wire terminal end portions 15b2) pulled out from the coil portions U1 to U7 to the second surface side are connected to the wiring 27U. The wires pulled out from the coil portions V1 to V7 to the second surface side are connected to the wiring 27V. The wires pulled out from the coil portions W1 to W7 to the second surface side are connected to the wiring 27W.

Figure 6:
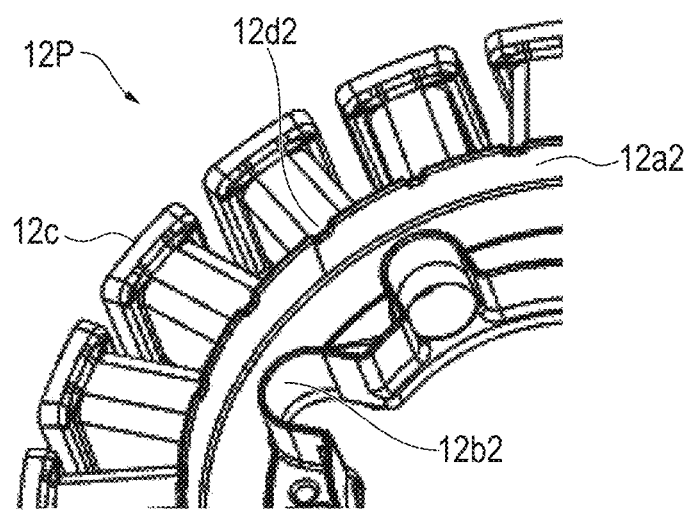
FIG. 6 is a partial perspective view of an insulator component on the second surface side of the stator, out of two resin members constituting the insulator of the stator.

FIG. 6 is a partial perspective view of an insulator component 12P constituting the second surface of the stator 10, out of the two resin members constituting the insulator 12. As shown in FIGS. 2 and 6, in an end portion (end surface, edge portion) of the first wall portion 12a2, recesses 12d2 for accommodating the wire extended portions 15a2 are formed correspondingly to the positions of the coil portions 13 (in accordance with intervals between the coil portions 13), at substantially equal intervals in the circumferential direction of the first wall portion 12a2. Similarly, in the end portion of the first wall portion 12a1 of an insulator component 12Q (details will be described later with reference to FIG. 9) configuring the first surface of the stator 10, recesses 12d1 (see FIGS. 2 and 9) for accommodating the wire extended portions 15a1 are formed correspondingly to the positions of the coil portions 13 (in accordance with intervals between the coil portions 13), at substantially equal intervals in the circumferential direction of the first wall portion 12a1.

By the wire extended portions 15a1, 15a2 being accommodated in the recesses 12d1, 12d2 and getting over (straddling) the first wall portions 12a1, 12a2, respectively, it is possible to prevent the wire extended portions 15*a*1, 15*a*2 from projecting in the thrust direction. As a result, it is possible to prevent the stator 10 from increasing in thickness in the thrust direction due to the wire extended portions 15*a*1, 15*a*2. In addition, it is possible to prevent the wire extended portions 15*a*1, 15*a*2 from being damaged, for example, by the wire extended portions 15*a*1, 15*a*2 accidentally being hooked when the stator 10 is introduced in an apparatus. Furthermore, quality of the outer appearance of the stator 10 can be improved. It should be noted that the recesses 12*d*1, 12*d*2 are not always necessary in terms of drive characteristics of the stator 10.

Figure 7A:
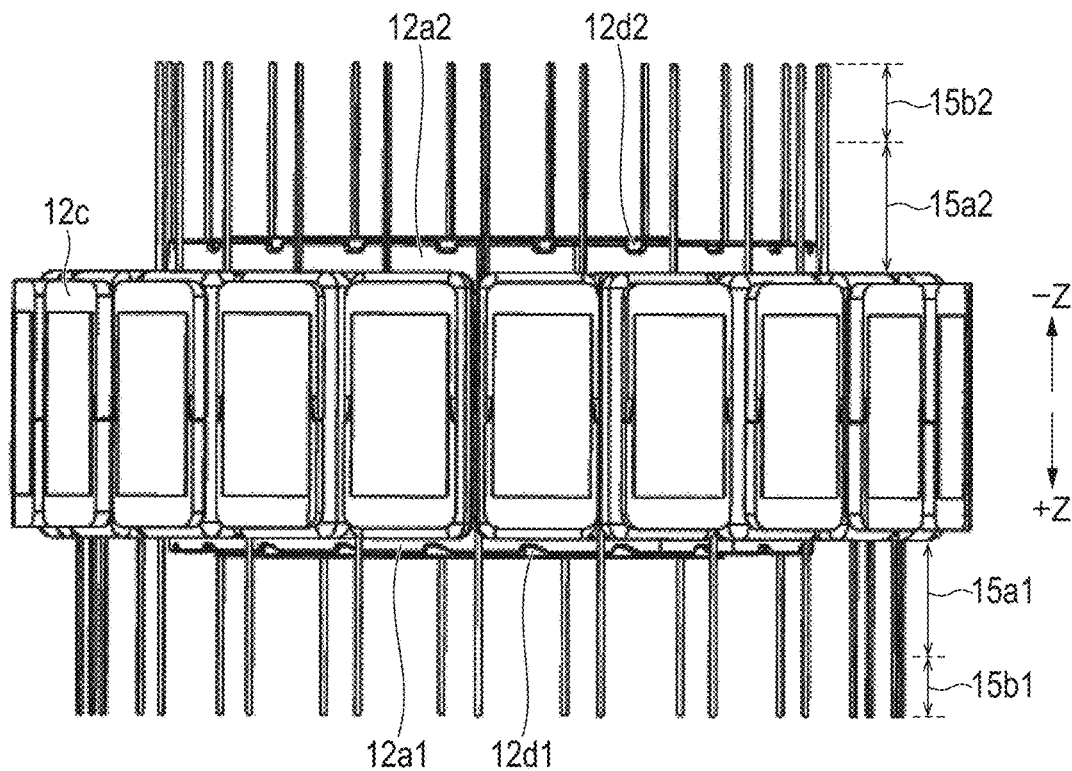
FIGS. 7A and 7B are views indicating the connection process of wires pulled out from a coil portion.

Next, a method for manufacturing the stator 10 will be described. FIG. 7A is a view showing a state after the coil portions 13 are formed in the process of manufacturing the stator 10 as viewed from the outer peripheral side of the stator 10. Processes of connecting the wire terminal end portion 15*b*2 to the bus ring 27, fitting the bus ring 27 into the insulator component 12P, and forming the molded portion 26 with an insulating resin, will be described below by taking the second surface of the stator 10 as an example. For convenience of explanation, in FIG. 7A, the second surface of the stator 10 is depicted on the upper side, and the first surface of the stator 10 is depicted on the lower side.

As described above, the wire extended portions 15*a*1, 15*a*2 are pulled out from one coil portion 13. It should be noted that, a known method which can be used for winding the wire around the winding pole of the stator 10 is described above, and thus the description thereof will be omitted. The wire extended portion 15*a*1 is pulled out from the coil portion 13 to the first surface side (+Z side), and the wire extended portion 15*a*2 is pulled out to the second surface side (−Z side).

Figure 7B:
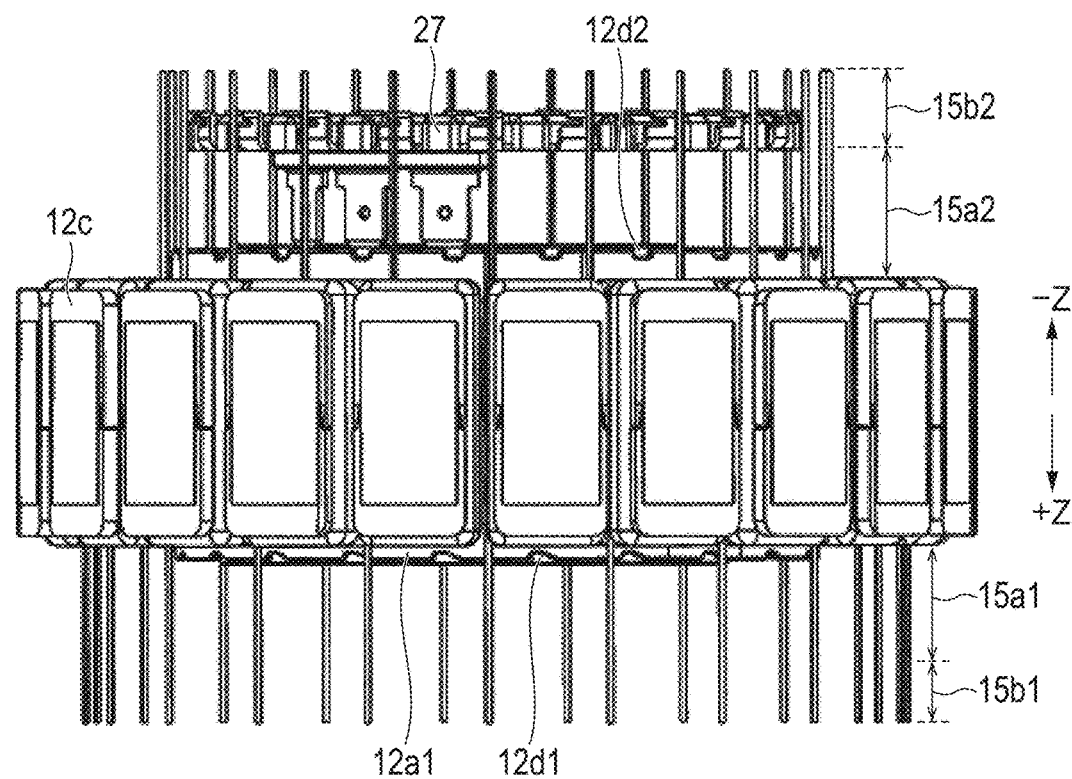

FIG. 7B is a view showing the positional relationship between the wire extended portion 15*a*2 and the wire terminal end portion 15*b*2 and the bus ring 27 when the wire terminal end portion 15*b*2 is connected to the bus ring 27, as viewed from the outer peripheral side of the stator 10. At the wire terminal end portion 15*b*2, it is necessary to remove the insulating coating of the wire in order to carry out electrical connection with the bus ring 27. In the present embodiment, the wire terminal end portion 15*b*2 is separated from the coil portion 13 by the length of the wire extended portion 15*a*2, and thus it is possible to prevent work of removing the insulating coating from being performed at a location close to the coil portion 13. As a result, it is possible to prevent the insulating coating of the wire from being accidentally removed in the coil portion 13 and the vicinity thereof. It should be noted that in the state shown in FIG. 7A, the process of removing the insulating coating on the wire terminal end portion 15*b*2 (and the wire terminal end portion 15*b*1) is completed. The process of removing the insulating coating may be performed mechanically or chemically.

The wire terminal end portion 15*b*2 is connected to the bus ring 27 by, for example, soldering. In the present embodiment, as shown in FIG. 4A, the wire terminal end portion 15*b*2 is bent at the connection portion in the bus ring 27 and is soldered in a state where the wire terminal end portion 15*b*2 and the bus ring 27 are mechanically engaged. Therefore, electrical connection is more reliable, and the wire terminal end portion 15*b*2 is prevented from easily coming off the bus ring 27 even if vibration or the like is applied from the outside. It should be noted that bending of the wire terminal end portion 15*b*2 is not always necessary. Furthermore, in a case where there is an unnecessary extra portion on the tip side of the wire terminal end portion 15*b*2, the unnecessary portion may be removed by cutting or the like. The wire terminal end portion 15*b*2 may be set in an extremely short length range of the tip portion of the wire and connected to the bus ring 27.

Then, the bus ring 27 is fitted into the insulator component 12P while being rotated about the center axis. At that time, the wire extended portion 15*a*2 is accommodated in the recess 12*d*2. The rotation direction does not matter. As a result, the wire extended portion 15*a*2 becomes in a state of straddling the first wall portion 12*a*2 along the first wall portion 12*a*2 at a certain angle with the direction parallel to the center axis. The certain angle here depends on the position of the recess 12*d*2, and may be in the range of 15° to 75°, for example.

Here, the shape of the bus ring 27 is not point-symmetric with respect to the center axis as shown in FIG. 4B, but is a shape along the shape of the first wall portion 12*a*2 and the second wall portion 12*b*2 shown in FIGS. 1B and 4A. Therefore, the length of the wire extended portion 15*a*2 is set to a length that allows the bus ring 27 to which the wire terminal end portion 15*b*2 is connected to be rotated about the center axis by a predetermined angle and to be fitted into the insulator component 12P. At that time, the length of the wire extended portion 15*a*2 is preferably set to a length such that the wire extended portion 15*a*2 can straddle the first wall portion 12*a*2 and the wire extended portion 15*a*2 is not greatly slackened. Furthermore, the height of the first wall portion 12*a*2 and the rotation angle of the bus ring 27 are also factors that determine the length of the wire extended portion 15*a*2.

The longer the wire extended portion 15*a*2 is and the farther the wire terminal end portion 15*b*2 from which the insulating coating needs to be removed is from the coil portion 13, the less the possibility that the coil section 13 will be damaged during the process of removing the insulation coating can be, and the more easily the process of removing the insulating coating can be performed. In addition, the wire used to form the coil portion 13 has the property of substantially maintaining the bent state once being bent, and the restoring property to the original shape is not great. Therefore, substantially, it is not necessary that the wire extended portion 15*a*2 is tensioned between the coil portion 13 and the bus ring 27. The same applies to the wire extended portion 15*a*1.

After fitting the bus ring 27 into a predetermined position in the insulator component 12P, an insulating resin is filled between the first wall portion 12*a*2 and the second wall portion 12*b*2 provided in the insulator component 12P, and the insulating resin that is filled is cured to form the molded portion 26. The insulating resin is not particularly limited in type, and for example, an epoxy resin, a urethane resin, an acrylic resin or the like can be used. For curing treatment of the insulating resin, various methods such as room temperature curing treatment, heat curing treatment, ultraviolet curing treatment or the like can be used, and the curing treatment is not particularly limited.

By forming the molded portion 26, the bus ring 27 is embedded in the molded portion 26, and the wire extended portion 15*a*2 and the wire terminal end portion 15*b*2 are firmly fixed, which enables vibration resistance of the stator 10 to be increased. Furthermore, since the wire terminal end portion 15*b*2 from which the insulating coating is removed and the wiring 27N of the bus ring 27 are covered with the insulating resin, waterproofness can be improved. With respect to the coil portion 13, the entire coil portion 13 is preferably subjected to varnish treatment at a predetermined timing in the manufacturing processes of the stator 10, for example, before or after forming the molded portion 26. As a result, waterproofness and reliability can be improved.

Connection between the wire (wire extended portion 15a1, wire terminal end portion 15b1) pulled out from the coil portion 13 and the bus ring 17, fitting of the bus ring 17 into the insulator 12, and formation of the molded portion 16 on the first surface side of the stator 10 can be performed in a similar manner as in the processes from the connection between the wire terminal end portion 15b1 and the bus ring 27 to the formation of the molded portion 26 on the second surface side of the stator 10, and therefore the description thereof is omitted.

Figure 8A:
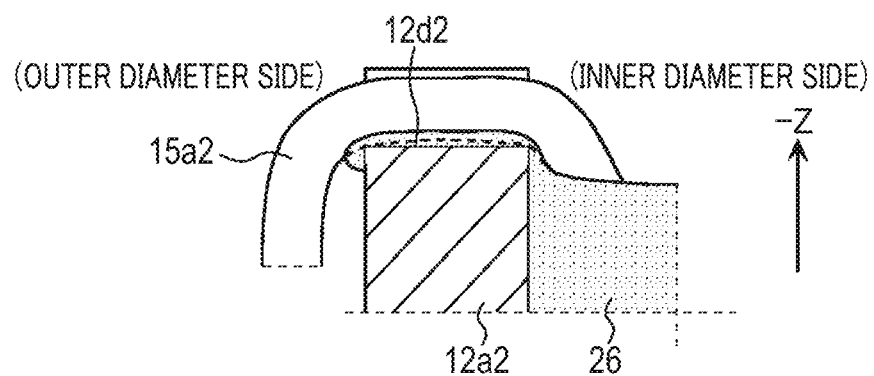
FIGS. 8A and 8B are views each indicating a contact portion between the wire extended portion and the insulator component.

FIG. 8A is a cross-sectional view indicating a desirable mode of arranging the wire extended portion 15a2 with respect to the recess 12d2. The wire extended portion 15a2 is directly accommodated in the recess 12d2. Desirably, the insulating resin forming the molded portion 26 is interposed between the wire extended portion 15a2 and the recess 12d2, which enables the wire extended portion 15a2 to be further firmly held. Therefore, vibration resistance can be improved.

It should be noted that, FIG. 8A shows a state in which the side surface of the wire extended portion 15a2 is in contact with the bottom portion of the recess 12d2; however, the wire extended portion 15a2 may be separated from the recess 12d2. Also in a case where the recess 12d2 is not provided, the insulating resin forming the molded portion 26 is desirably interposed between the end portion of the first wall portion 12a2 and the wire extended portion 15a2 that gets over the end portion of the first wall portion 12a2.

Figure 8B:
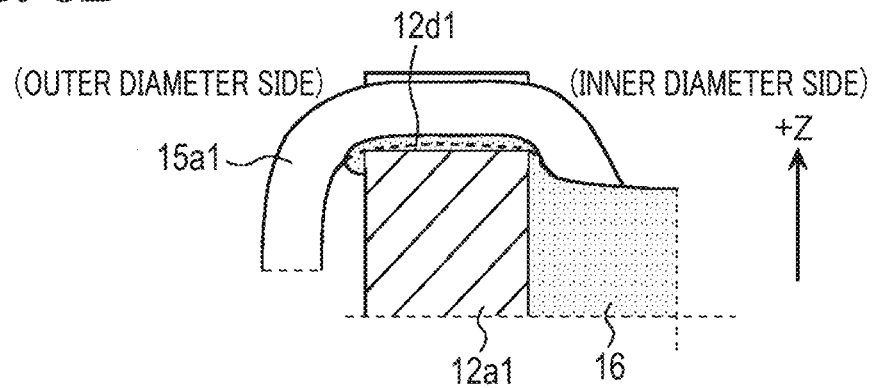

FIG. 8B is a cross-sectional view illustrating a desirable mode of arranging the wire extended portion 15a1 with respect to the recess 12d1. The desirable mode of arranging the wire extended portion 15a1 with respect to the recess 12d1 is similar to the desirable mode of arranging the wire extended portion 15a2 with respect to the recess 12d2 described above, and thus detailed description thereof is omitted.

The preferred embodiment of the present invention has been described above; nevertheless, the present invention is not limited to the above-described embodiment, and various modifications and changes can be made within the scope of the gist thereof.

Figure 9:
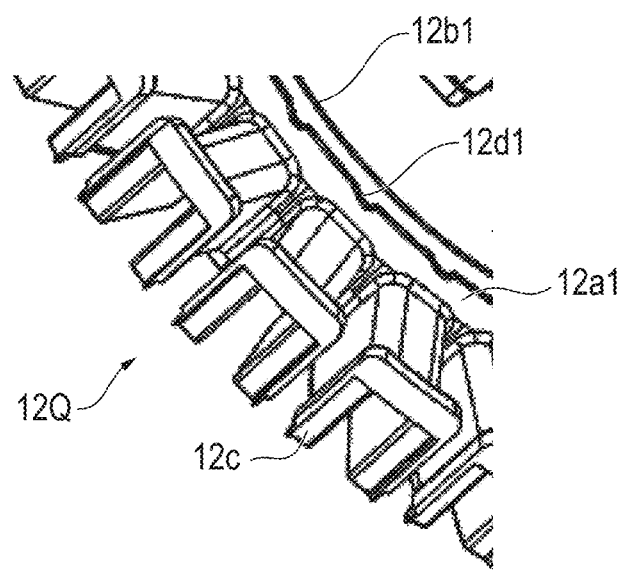
FIG. 9 is a partial perspective view of an insulator component on the first surface side of the stator, out of the two resin members constituting the insulator of the stator.

FIG. 9 is a partial perspective view of the insulator component 12Q constituting the first surface of the stator 10, out of the two resin members constituting the insulator 12. As shown in FIG. 6, the recess 12d2 of the insulator component 12P that constitutes the second surface of the stator 10 is formed to have a substantially rectangular shape when the stator 10 is viewed from the outer peripheral side (see also FIGS. 7A and 7B). In contrast, the recess 12d1 formed in the first wall portion 12a1 of the insulator component 12Q has the shape shown in FIG. 9. Regarding the recess 12d1, one of the standing wall surfaces with respect to the bottom surface of the recess 12d1 is a surface parallel to the thrust direction, that is, a surface vertical to the bottom surface, and the other of the standing wall surfaces is an inclined surface forming a predetermined angle with the thrust direction. In this case, the wire extended portion 15a1 can be easily accommodated in the recess 12d1 by accommodating the bus ring 17 in the insulator 12 while rotating the bus ring 17 in direction from the inclined surface side toward the vertical surface side. The shapes of the recesses are not limited to these, and may be a U-shape or a semicircular shape as viewed from the outer peripheral side, for example.

This application claims the benefit of Japanese Patent Application No. 2019-196226 filed on Oct. 29, 2019 which is hereby incorporated by reference herein in its entirety.

What is claimed is:

1. A stator comprising:
a stator core that includes a plurality of teeth radially projecting with a center axis of the stator as a center; and
an insulator that covers at least the plurality of teeth, wherein a plurality of coil portions is formed by winding wires around portions of the insulator that cover the plurality of teeth, wherein
the insulator includes a first wall portion that has a cylindrical shape and is provided on a side of the center axis with respect to the plurality of coil portions, a second wall portion that is provided closer to the center axis than the first wall portion, and a molded portion that is formed by resin filled between the first wall portion and the second wall portion,
the first wall portion is provided closer to the center axis than the plurality of teeth,
each of the wires pulled out from each of the plurality of coil portions includes a wire terminal end portion on a tip side, and a wire extended portion between the wire terminal end portion and the coil portion, and
the wire extended portion straddles the first wall portion, and a wire connecting member to which the wire terminal end portion is connected is held by the molded portion.

2. The stator according to claim 1, wherein the wire connecting member is embedded in the molded portion while being fitted between the first wall portion and the second wall portion.

3. The stator according to claim 1, wherein the resin that forms the molded portion is interposed between an edge portion of the first wall portion and the wire extended portion that straddles the first wall portion.

4. The stator according to claim 1, wherein recesses in each of which the wire extended portion is accommodated are provided in an edge portion of the first wall portion at substantially equal intervals in a circumferential direction of the first wall portion.

5. The stator according to claim 4, wherein the resin that forms the molded portion is interposed between a bottom surface of each of the recesses and the wire extended portion.

6. The stator according to claim 1, wherein the resin that forms the molded portion is an epoxy resin, a urethane resin, or an acrylic resin.

7. The stator according to claim 1, wherein the wire extended portion is arranged along the first wall portion and/or forms a certain angle with a direction parallel to the center axis.

8. A method for manufacturing a stator including a stator core that includes a plurality of teeth radially projecting with a center axis of the stator as a center, and an insulator that covers at least the plurality of teeth, wherein a plurality of coil portions is formed by winding wires around portions of the insulator that cover the plurality of teeth, the method for manufacturing the stator comprising:
electrically and mechanically connecting a terminal end portion of each of the wires to a wire connecting member that has an annular shape, wherein each of the wires pulled out from each of the plurality of coil portions in a same direction includes a wire terminal end portion on a tip side, and a wire extended portion between the wire terminal end portion and the coil portion;

rotating the wire connecting member in a circumferential direction and fitting the wire connecting member into a gap between a first wall portion that has a cylindrical shape and is provided in the insulator on a side of the center axis with respect to the plurality of coil portions and a second wall portion that is provided in the insulator and is provided closer to the center axis than the first wall portion, while the wire extended portion straddles the first wall portion; and holding the wire connecting member by resin being filled on the side of the center axis with respect to the first wall portion to form a molded portion.

9. The method for manufacturing the stator according to claim 8, wherein the molded portion is formed by the resin being filled between the first wall portion and the second wall portion.

10. The method for manufacturing the stator according to claim 8, wherein the stator is provided with recesses in an edge portion of the first wall portion in accordance with intervals between the plurality of coil portions, and wherein the method for manufacturing the stator further comprises accommodating each the wire extended portion into each of the recesses when the wire connecting member is fitted into the insulator.

\* \* \* \* \*